US010125880B2

(12) United States Patent
Hielkema

(10) Patent No.: US 10,125,880 B2
(45) Date of Patent: Nov. 13, 2018

(54) AIR PRESSURE REGULATOR

(71) Applicant: GE Aviation Systems LLC, Grand Rapids, MI (US)

(72) Inventor: Jerry Dean Hielkema, Loves Park, IL (US)

(73) Assignee: GE Aviation Systems LLC, Grand Rapids, MI (US)

( * ) Notice: Subject to any disclaimer, the term of this patent is extended or adjusted under 35 U.S.C. 154(b) by 78 days.

(21) Appl. No.: 14/823,345

(22) Filed: Aug. 11, 2015

(65) Prior Publication Data

US 2017/0045149 A1 Feb. 16, 2017

(51) Int. Cl.
*F16K 15/18* (2006.01)
*F16K 31/08* (2006.01)
*G05D 16/02* (2006.01)
*G05D 16/06* (2006.01)

(52) U.S. Cl.
CPC ............ *F16K 15/185* (2013.01); *F16K 31/08* (2013.01); *G05D 16/02* (2013.01); *G05D 16/0655* (2013.01); *Y10T 137/7825* (2015.04)

(58) Field of Classification Search
CPC . F16K 15/185; F16K 7/12; F16K 9/34; F16K 31/08; G05D 16/02; G05D 16/04; G05D 16/2006; G05D 16/0655; F16F 9/34; Y10T 137/7793; Y10T 137/7822; Y10T 137/7812; Y10T 137/7825; Y10T 137/599; Y10T 137/5994
USPC ........... 251/64, 65, 129.17, 129.08; 137/505, 137/505.38, 505.41, 505.42, 505.29, 137/315.04, 315.05, 505.14, 505.39
See application file for complete search history.

(56) References Cited

U.S. PATENT DOCUMENTS 2,405,371 A 8/1946 Salmonsen
3,149,828 A * 9/1964 Schutmaat ......... G05D 16/0655 137/505.42
3,621,867 A * 11/1971 Johnson ................ F16K 17/085 137/116.5
3,771,761 A * 11/1973 Standke ............. F16K 31/0655 251/129.12

(Continued)

FOREIGN PATENT DOCUMENTS

CN 103842700 A 6/2014
DE 3402117 A1 7/1985

(Continued)

OTHER PUBLICATIONS

GB Report issued in connection with corresponding GB Application No. GB1613524.6 dated Dec. 19, 2016.

(Continued)

*Primary Examiner* — Craig J Price
*Assistant Examiner* — Andrew J Rost
(74) *Attorney, Agent, or Firm* — GE Aviation Systems LLC; William Andes

(57) ABSTRACT

An air pressure regulator includes a regulator body defining a hollow interior, an air inlet in communication with the hollow interior and configured to connect with a source of pressurized air, an air outlet fluidly coupled with the air inlet, and a valve stem positioned at the air inlet and configured to regulate the pressure of the pressurized air for the air outlet by way of movement of the valve stem relative to the air inlet.

19 Claims, 3 Drawing Sheets

16 44 40 42 46 86 48 72 74 66 80 64 52 62 50 84 82 78 81 76 70 49 68 58 54 60 56

(56) References Cited

U.S. PATENT DOCUMENTS

| | | | | |
|---|---|---|---|---|
| 4,574,841 | A * | 3/1986 | Hugler | F16K 31/082 137/596.17 |
| 4,760,862 | A * | 8/1988 | Mutou | G05D 16/0655 137/315.05 |
| 5,285,810 | A * | 2/1994 | Gotthelf | B60K 15/03006 137/340 |
| 5,356,225 | A | 10/1994 | Hanes et al. | |
| 5,538,332 | A * | 7/1996 | Carroll | B60T 15/52 251/64 |
| 5,544,856 | A * | 8/1996 | King | F16K 3/24 251/122 |
| 5,547,165 | A | 8/1996 | Brehm et al. | |
| 6,629,544 | B2 * | 10/2003 | Nakajima | G05D 16/0663 137/505 |
| 7,762,521 | B2 * | 7/2010 | Brun | F04B 7/0076 251/129.04 |
| 8,195,336 | B2 | 6/2012 | Kawashima et al. | |
| 8,905,067 | B2 | 12/2014 | Maichl et al. | |

FOREIGN PATENT DOCUMENTS

| | | | |
|---|---|---|---|
| DE | 3402119 | A1 | 7/1985 |
| JP | S5970979 | U | 5/1984 |

OTHER PUBLICATIONS

Chinese Office Action issued in connection with corresponding CN Application No. 201610654506.3 dated Jun. 29, 2017.

Machine translation and office action issued in connection with corresponding JP Application No. 016152404 dated Dec. 26, 2017.

* cited by examiner

AIR PRESSURE REGULATOR

BACKGROUND OF THE INVENTION

An air pressure regulator is a type of valve or air-restriction device for an air pressure system that regulates the flow of a gas at a certain pressure. For example an air pressure regulator can be utilized to allow a high-pressure gas supply to be reduced to a lower pressure supply, for further use in various applications of the air pressure system. The air pressure regulator can match the flow of the gas at the output of the regulator based on demand for gas placed upon the pressure system, the supply of gas provided to the regulator, or a combination of the two.

Aircraft having turbine engines can be configured to generate compressed or pressurized air at the compressor section of the engines, which can be provided to supply pressurized air to various air pressure systems of the aircraft. This pressured air, or "bleed air," can be further adjusted by the air pressure regulators described above, and supplied to air pressure systems of the aircraft, including, but not limited to air supply and cabin pressure controllers, cooling of various aircraft or engine components, anti-icing systems, pneumatic actuators or motors, hydraulic reservoirs, or waste and water storage systems.

BRIEF DESCRIPTION OF THE INVENTION

In one aspect, an air pressure regulator includes a regulator body defining a hollow interior, an air inlet in communication with the hollow interior and configured to connect with a source of pressurized air, an air outlet fluidly coupled with the air inlet, a valve stem positioned at the air inlet and configured to regulate the pressure of the pressurized air for the air outlet by way of movement of the valve stem relative to the air inlet, a restraining element disposed within the hollow interior and coupled with the valve stem such that the valve stem and the restraining element move in unison wherein the restraining element includes an electrically conductive sleeve, and a magnet having a magnetic field mounted to the regulator body wherein the magnetic field encompasses at least part of the conductive sleeve. Movement of the conductive sleeve relative to the magnetic field is retarded by Eddy currents generated in the conductive sleeve by the movement.

In another aspect, an air pressure loading element includes a housing defining a hollow interior, a restraining element disposed within the hollow interior, having an electrically conductive sleeve, and coupled with a valve stem positioned at an air inlet and configured to regulate the pressure of pressurized air for an air outlet by way of movement of the valve stem relative to the air inlet, wherein the valve stem and the restraining element move in unison, and a magnet having a magnetic field mounted to the housing wherein the magnetic field encompasses at least part of the conductive sleeve. Movement of the conductive sleeve relative to the magnetic field is retarded by Eddy currents generated in the conductive sleeve by the movement.

In yet another aspect, an air pressure regulator includes a restricting element configured to provide variable restriction to regulate the pressure of pressurized air at an air inlet for an air outlet, by way of movement of the restricting element relative to the air inlet, a restraining element coupled with the restricting element and having an electrically conductive sleeve, wherein the restricting element and the restraining element move in unison, and a stationary magnet fixed proximate to the conductive sleeve and having a magnetic field, wherein the magnetic field encompasses at least part of the conductive sleeve, and the conductive sleeve is movable relative to the magnet. Movement of the conductive sleeve relative to the magnetic field is retarded by Eddy currents generated in the conductive sleeve by the movement.

DESCRIPTION OF EMBODIMENTS OF THE INVENTION

The embodiments of the invention described herein are provided with respect to an air pressure regulator used in an air pressure system of an aircraft, but it will be understood that the apparatus described herein can be implemented in any environment using an air pressure regulator or air pressure regulator loading element utilized for regulating air pressure from a first pressure at an inlet to a second pressure at an outlet.

Figure 1:
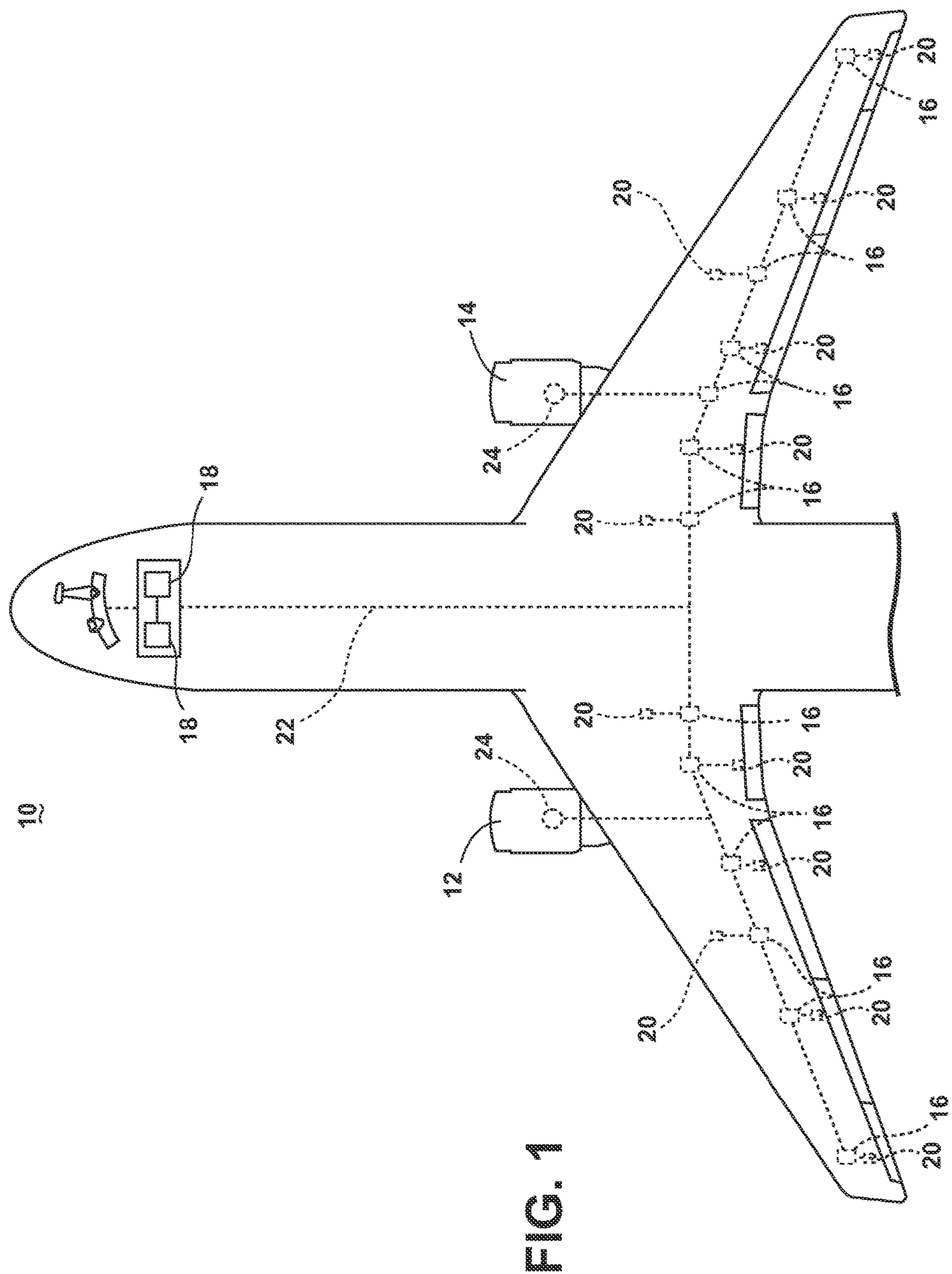
FIG. 1 is a top down schematic view of the aircraft and avionics data network architecture of an aircraft.

As illustrated in FIG. 1, an aircraft 10 can include at least one propulsion engine, shown as a left engine system 12 and right engine system 14, such as gas turbine engines. The left and right engine systems 12, 14 are shown to schematically include a compressor section 24 configured to generate compressed or pressurized air for the combustion of the respective engines 12, 14. The compressor section 24 can further include, or be configured to generate, "bleed air," which is pressurized air not used in combustion of the respective engines 12, 14, but rather supplied by the compressor section 24 to provide pressurized air to various air pressure systems of the aircraft 10.

The aircraft 10 can further include a set of pneumatic systems, including, but not limited to, air supply and cabin pressure controllers 18, or pneumatic actuators or motors 20. Additional pneumatic systems can include, for example, cooling of various aircraft 10 or engine 12, 14 components, anti-icing systems, hydraulic reservoirs, or waste and water storage systems. The pressure controllers 18 and pneumatic motors 20 can be fluidly coupled with the bleed air supplied by the compressor sections 24, by way of one or more air pressure regulators 16 and a set of pneumatic couplings, such as tubing 22. The air pressure regulators 16 can be configured to regulate a supply air pressure to a predetermined output air pressure.

The aircraft 10 illustrated provides one example embodiment of an aircraft 10 configuration, with respect to the pneumatic systems. While the air supply and cabin pressure controllers 18 are illustrated near the nose of the aircraft 10 and the pneumatic motors 20 are shown arranged about the aircraft 10 and wings, the illustrated positions are not germane to embodiments of the disclosure, and embodiments are envisioned wherein any placement or location of the respective pressure controllers 18 or pneumatic motors 20 are possible. Furthermore, the illustrated aircraft 10 embodiment is merely one non-limiting example of an aircraft 10 that can be used in embodiments of the invention described herein. Particularities of the illustrated aircraft 10 embodiment, including relative size, length, number of engines, type of engines, and location of various components are not germane to the embodiments of the invention, unless otherwise noted.

Figure 2:
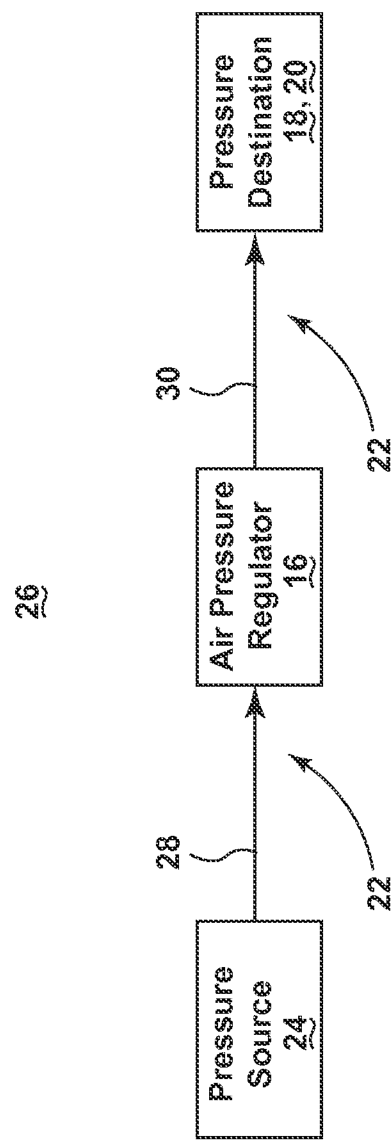
FIG. 2 is a schematic view of a pressure regulating system.

FIG. 2 illustrates a schematic example operation of an air pressure system 26 of FIG. 1. As shown, a pressure source, such as the compressor section 24 of the left and right engine systems 12, 14 generate or produce pressurized bleed air 28. The bleed air 28 can be regulated by a set of air pressure regulators 16 to regulate the supply air pressure to a predetermined pressurized output air 30 for the pressure destination, such as the pneumatic systems 18, 20 of the aircraft 10. The compressor section 24, set of air pressure regulators 16, and pneumatic systems 18, 20 are all interconnected by the pneumatic tubing 22. Typically, air pressure regulators 16 are configured to step-down, or reduce the supply air pressure of the bleed air 28 to a lower output air pressure of the output air 30. Embodiments of the disclosure are envisioned wherein an air pressure regulator 16 is configured or matched with one or more pneumatic systems 18, 20, such that the regulator 16 regulates the pressurized output air 30 to a predetermined air pressure designed or selected for the one or more pneumatic systems 18, 20. For example, pneumatic systems 18, 20 configured to operate at a common air pressure can be configured to receive the output air 30 from a single air pressure regulator 16. Alternatively, each pneumatic system 18, 20 can utilize individual air pressure regulators 16, for example, for improved reliability or reduced disruption in the event of a system 18, 20 or regulator 16 failure. In yet another example, a set of cascading air pressure regulators 16 can step down bleed air 28, as needed for pneumatic systems 18, 20.

Figure 3:
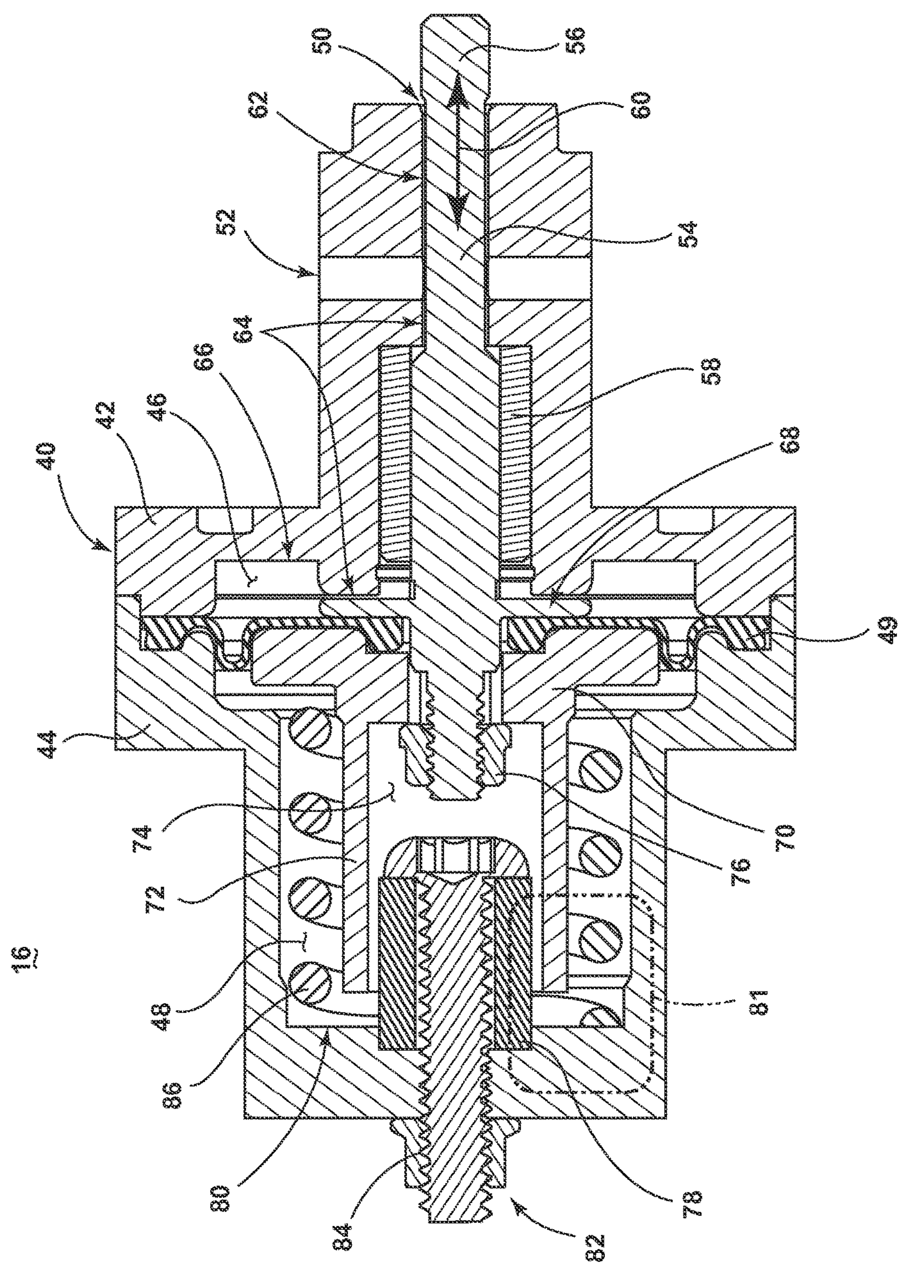
FIG. 3 is a cross-sectional view of an air pressure regulator.

FIG. 3 illustrates a cross-sectional view of an air pressure regulator 16, according to embodiments of the disclosure. The air pressure regulator 16 includes a regulator body 40 including a first housing 42 and a second housing 44 coupled together. The first housing 42 and second housing 44 can be coupled by known mechanical or fastening means, such as with screws, bolts, adhesives, and the like. The first housing 42 defines a first hollow interior 46 and the second housing defines a second hollow interior 48, wherein the first and second interiors 46, 48 are fluidly isolated from one another by at least a portion of a pressure regulating device, such as a flexible diaphragm 49. The flexible diaphragm 49 can be configured, molded, formed, or the like to include an operable or resting bias, wherein the diaphragm 49 can generate a reactive or opposing force when flexed, such that the bias operates to return the diaphragm 49 to an unflexed state or position. The air pressure regulator 16 can be mounted to a pressure manifold by way of a number of mounting methods or mechanisms, including, but not limited to, bolts. The methods or mechanisms for mounting the air pressure regulator 16 are not germane to embodiments of the disclosure.

The first housing 42 further includes an air inlet 50 configured to connect with a source of pressurized air and receive a supply of pressurized supply air. The first housing 42 can also include an air outlet 52 configured to supply regulated pressurized air, for example, to pneumatic tubing 22 or to a pneumatic system 18, 20. The first housing 42 additionally includes a valve stem 54 positioned at, or slidably received by, the first housing 42 at the air inlet 50, wherein the valve stem 54 includes a valve stem head 56. The valve stem 54 can be supported by a slidable element 58, including, but not limited to bearing, configured to allow the stem 54 to reciprocate or be moveable within the regulator body 40 (shown by arrows 60). The first housing 42 is further configured to include a first channel 62 about the valve stem 54 in fluid communication with, or fluidly coupling the air inlet 50 with the air outlet 52 and a second channel 64 in fluid communication with, or fluidly coupling the first channel with a pressure chamber 66. The pressure chamber 66 can be defined by, for example, the first interior 46 of the first housing 42 and the diaphragm 49. In this sense, the pressure chamber 66 is sealed such that pressurized air can only be supplied by the air inlet 50 and relieved by the air outlet 52. The diaphragm 49 can be further coupled with a second end 68 of the valve stem 54, distal from the valve stem head 56. In this sense, the flexible diaphragm 49 separating the first interior 46 and the second interior 48 can be configured to allow for the slidable movement 60 of the valve stem 54 within the first housing 42, while still fluidly isolating the first interior 46 from the second interior 48.

The valve stem head 56 is sized, shaped, and configured to interact with the air inlet 50 such that when the valve stem 54 or valve stem head 56 is fully received within the first housing 42, the valve stem head 56 restricts, restrains, or prevents supply air from being received into the air inlet 50. One non-limiting example of a valve stem head 56 can include a poppet valve. For example, as illustrated, the valve stem head 56 can be sized such that the head 56 is larger than the air inlet 50 opening. In this sense, the valve stem head 56 is configured to modify, change, or regulate the amount of pressurized air received at the air inlet 50 by way of movement 60 of the valve stem 54 and valve stem head 56 relative to the air inlet 50. In this sense, the valve stem head 56 is a restricting element configured to provide variable restriction of air or air pressure received by the air inlet 50. While the view of FIG. 3 does not show the cross-section of the valve stem head 56 or the air inlet 50, embodiments of the disclosure are envisioned wherein the respective shapes of the head 56 and inlet 50 are keyed, adapted, or complimentary of one another to provide the restriction, restraining, or prevention of supply air from being received into the air inlet 50 when the head 56 is fully received.

The regulation of the supply of pressurized air received by the air inlet 50 to the air outlet 52 is accomplished, as explained herein. When the valve stem head 56 is not fully restricting pressurized air to be received at the air inlet 50, a portion of the pressurized air is delivered to the air outlet 52 by way of the first channel 62. Simultaneously, another portion of the pressurized air received at the air inlet 50 is delivered to the pressure chamber 66, by way of the first channel 62 and the second channel 64. As explained above, the pressure chamber 66 is sealed such that pressure in the pressure chamber 66 can only be received or relieved by, respectively, the air inlet 50 and the air outlet 52. As pressure from the pressurized air received at the air inlet 50 builds in the pressure chamber 66, the flexible diaphragm 49 flexes, causing the volume of the chamber 66 to expand.

The expanse of the pressure chamber 66, in turn, causes movement 60 of the valve stem 54 and valve stem head 56, relative to the air inlet 50. As previously explained, the movement 60 of the valve stem head 56 relative to the air inlet 50 consequently restricts, retrains, or prevents further pressurized air from being received at the air inlet 50. With the air inlet 50 restricted or restrained, and thus, not delivering the previous amount of pressurized air, pressure in the pressure chamber 66 is reduced as pressure is relieved by way of the air outlet 52. The reduction in pressure in the pressure chamber 66, in turn, causes the flexible diaphragm 49 to retract, and the resulting movement 60 of the valve stem 54 and valve stem head 56 relative to the air inlet 50 allows the air inlet 50 to receive more or additional air pressure.

Thus, the configuration of the air pressure regulator 16 allows for the regulation of pressurized air received at the air inlet 50 to pressurized air delivered to the air outlet 52. The diaphragm 49, pressure chamber 66, valve stem 54, valve stem head 56, and air inlet 50 can thus be configured or adjusted to allow for a predetermined pressurized air delivered to the air output 52 when supplied by pressurized air having an air pressure greater than or equal to the predetermined pressurized air delivered. When the pressure of the pressurized air supplied to the air inlet 50 is reliably steady, that is, the air pressure received at the air inlet 50 does not vary, the air pressure regulator 16 can balance, or find equilibrium between the pressure in the pressure chamber 66, the movement 60 of the valve stem 54 or valve stem head 56, and thus, the air pressure delivered to the air outlet 52. When the pressure of the pressurized air supplied to the air inlet 50 is unreliable, or varies over time, the air pressure regulator 16 can reactively adjust the amount of pressurized air received at the air inlet 50 and delivered to the air outlet 52, by way of movement 60 of the valve stem 54 or valve stem head 56, as explained above.

The second housing 44 can include a restraining element 70 or loading element slidably mounted with the valve stem 54, opposed to the first interior 46, pressure chamber 66, or diaphragm 49. As used herein, a "restraining element" 70 or "loading element" can be any element or set of elements configured to account for, or adjusted for, a predetermined force, pressure, or "load" placed on the loading element. The restraining element 70 is fixedly mounted with the valve stem 54 such that the restraining element 70 moves in unison with the valve stem 54. The restraining element 70 can be formed, molded, machined, or the like, from an electrically conductive material, such as copper, and can include an electrically conductive sleeve 72 encircling a hollow bore 74. As shown, the conductive sleeve 72 and hollow bore 74 are configured away from the mounting with the valve stem 54, extending axially into the second interior 48 of the second housing 44. Embodiments of the restraining element 70 can be, for example, mechanically mounted with the valve stem 54, such as by way of a bolt 76 or screw. While a mechanical bolt 76 is illustrated, any mechanical coupling mechanisms, adhesives, or the like can be utilized for mounting the restraining element 70 with the valve stem 54, and the particular mounting mechanism is not germane to embodiments of the invention. Additionally, while the conductive sleeve 72 is described as encircling the hollow bore 74, alternative cross-sectional shape configurations of the conductive sleeve 72 are envisioned wherein the sleeve 72 encompasses the bore 74. Example alternative cross-sectional shapes can include, but are not limited to, square, triangular, trapezoidal, hexagonal, etc.

The second housing 44 can further include a stationary magnet 78, fixedly supported by a back wall 80 of the second housing 44, and sized to be received by the hollow bore 74 of the conductive sleeve 72. The magnet 78 can include, for example, a permanent magnet or an electromagnet, and is configured such that the magnet 78 is axially magnetized. The magnet 78 and the conductive sleeve 72 are configured proximate or relative to one another such that a first magnetic field (represented by a dotted magnetic flux 81) path generated by the magnet 78 interacts with or encompasses at least part of the conductive sleeve 72. The magnet 78 or the back wall 80 of the second housing 44 can further include an adjuster 82, such as a screw interface 84, configured to adjust the position of the magnet 78 relative to the conductive sleeve 72. The adjuster 82 can, for example, operably extend or retract the magnet 78 into or out of (respectively) the second interior 48 or hollow bore 74 of the conductive sleeve 72, to adjust the amount of first conductive field interaction or encompassment of the sleeve 72. While a screw interface 84 is shown, alternative adjuster mechanisms or means can be included.

The second housing 44 can additionally include a mechanical restraining element, such as a mechanical spring 86 positioned in the second interior 48 between the back wall 80 and a portion of the restraining element 70. The spring 86 can be configured to bias the restraining element 70 away from the back wall 80 with a predetermined amount of mechanical force. The spring 86 and diaphragm 49 (by way of the resting bias) can be individually or collectively configured or selected to provide for or generate an opposing force to counteract, oppose, or retard the expansion of the pressure chamber 66. In this sense, as higher pressure air is received at the air inlet 50 and builds pressure within the pressure chamber 66, the spring 86 or diaphragm 49 can be selected to oppose the expansion of the pressure chamber 66 such that the air pressure supplied at the air outlet 52 is regulated to the desired or predetermined outlet air pressure, by way of the movement 60 of the valve stem 54 and valve stem head 56.

In an aircraft 10 embodiment of the disclosed air pressure regulator 16, the regulator 16 can be subjected to a large amount of external vibrations during flight that can cause unintended, unexpected or otherwise undesirable movement 60 of the valve stem 54, valve stem head 56, air inlet 50, air outlet 52, first housing 42, second housing 44, or diaphragm 49, producing large or small temporary variations in the air pressure supplied to the air outlet 52. Moreover, any components coupled with the air pressure regulator 16, such as tubing 22, or structural supports, can likewise produce to transfer vibrations to the regulator 16. Additionally, in any embodiment of the disclosed air pressure regulator 16, pulses or variations of the air pressure received at the air inlet 50 can likewise cause or generate temporary variations in the air pressure supplied to the air outlet 52. Variations of the air pressure supplied to the air outlet 52 can have further undesirable downstream effects for pneumatic systems. For example, if the air pressure supply by the air outlet 52 is used as a reference pressure, variation in that supplied air pressure can lead to system instability.

Embodiments of the disclosure can be configured such that the conductive sleeve 72 and magnet 78 can further reduce the temporary variations in air pressure supplied to the air outlet 52. During temporary fluctuations of air pressure regulator 16 operations, including, but not limited to vibrations and air pressure received at the air inlet 50, the movement 60 of the valve stem 54, valve stem head 56, or diaphragm 49 can be opposed to, counteracted by, or retarded by the movement of the conductive sleeve 72 relative to the magnet 78 or the first magnetic field. In this sense, the movement of the conductive sleeve 72 about the magnet 78 and the first magnetic field changes the magnetic flux experienced by the sleeve 72 (e.g. the amount of the first magnetic field passing through the sleeve 72), and induces an electric current in the conductive sleeve 72. The induction of electric current in the conductive sleeve 72, in turn, generates Eddy currents in the sleeve 72 proportional to the strength of the first magnetic field, the area of the loop of current, and the rate of change in the magnetic flux. The Eddy currents are thus proportional to the amount of movement 60 of the conductive sleeve 72 relative to the magnet 78 or the first magnetic field, as well as proportion to the speed of said movement 60.

The generated Eddy current in the conductive sleeve 72 produces a second magnetic field opposed to the first magnetic field produced by the magnet 78. In this sense, the movement 60 of the conductive sleeve 72 relative to the magnet 78 and first magnetic field produces an opposing second magnetic field that opposes, counteracts, retards, restrains, or dampens the movement 60, itself. Moreover, since the second magnetic field is proportional to the amount of movement 60 as well as the speed of said movement 60, the dampening of the movement 60 increases simultaneously as the movement 60 increases.

Thus, embodiments of the disclosure can be collectively configured to work in unison with the restraining element 70 or loading element, spring 86, and diaphragm 49, or independently from the aforementioned components 70, 86, 49, to provide for or generate an opposing force to counteract, oppose, dampen, or retard variations of air pressure supplied at the air outlet 52, as explained above. The opposing force provided by the restraining element 70 provides a variable restriction to regulate the air pressure supplied to the air outlet 52, by way of the valve stem 54 and valve stem head 56.

Many other possible embodiments and configurations in addition to that shown in the above figures are contemplated by the present disclosure. For example, one embodiment of the invention contemplates utilizing an electromagnet in place of the magnet 78. In this alternative example, the electromagnet can be selectively supplied with power from a power source to generate a magnetic field relative to the conductive sleeve 72 to counteract, oppose, dampen, or retard the movement 60 of the restraining element 70, valve stem 54, or valve stem head 56, as explained herein. The selective supplying of power to the electromagnet can further be controllable in response to the movement 60 of, for example, the conductive sleeve 72. For instance, a sensor, such as a positional sensor, pressure sensor, accelerometer, or air pressure sensor fluidly positioned at the air inlet 50 or air outlet 52 can sense, measure, or provide indication when a variation of pressurized air supplied to the air outlet 52 is occurring, or is likely to occur. The power supply can supply power to the electromagnet, and consequently, adjust the magnetic field to counteract the variation of pressurized air supplied to the air outlet 52 in response to the indication by the sensor. This configuration can provide stronger magnetic fields than a permanent magnet would be capable of providing alone.

In another embodiment, at least a portion of the regulator body 40, first housing 42, or second housing 44 can include a thermally conductive cooling path that is thermally coupled with the restraining element 70 or conductive sleeve 72. In this embodiment of the disclosure, heat generated in the conductive sleeve 72 due to the induced Eddy currents can be dissipated by way of the cooling path. In yet another embodiment of the disclosure, the air pressure regulator 16 can be configured such that the magnet 78, magnetic field, and conductive sleeve 72 provide for counteracting, opposing, dampening, or retarding the movement 60 of the valve stem 54 and valve stem head 56, without additional mechanical restraining elements, such as the spring 86. Additionally, the design and placement of the various components can be rearranged such that a number of different in-line configurations could be realized.

The embodiments disclosed herein provide an air pressure regulator 16 wherein movement 60 of the conductive sleeve 72 relative to the magnet field is retarded by Eddy currents generated in the conductive sleeve 72 by the movement 60. The technical effect is that the above described embodiments enable the dampening of unintended movement 60 in the air pressure regulator 16 due to pressure fluctuations or vibrations of the regulator 16. One advantage that can be realized in the above embodiments is that the above described embodiments provide for a contained and self-regulating configuration for regulating a received air pressure to a regulated supply air pressure, wherein the restraining element reduces or dampens the variations of movement or pressure changes experienced by the air pressure regulator. Another advantage of embodiments of the disclosure can include no additional requirement or power needs for improved air pressure regulation when a permanent magnet is utilized. Alternatively, in embodiments of the disclosure where an electromagnet is utilized, a stronger magnetic field can be utilized to provide for improved dampening or counteraction of the variations experienced by the air pressure regulator.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. All combinations or permutations of features described herein are covered by this disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An air pressure regulator comprising:

a regulator body having a housing and defining a hollow interior;

an air inlet in communication with the hollow interior and configured to connect with a source of pressurized air;

an air outlet fluidly coupled with the air inlet;

a valve stem positioned at the air inlet and configured to regulate the pressure of the pressurized air for the air outlet by way of slidable movement of the valve stem relative to the air inlet;

a restraining element disposed within the hollow interior and coupled with the valve stem such that the valve stem and the restraining element move in unison wherein the restraining element includes an electrically conductive sleeve encircling a hollow bore; and a magnet having a magnetic field mounted to the regulator body wherein the magnet is received by the hollow bore and the magnetic field encompasses at least part of the conductive sleeve;

wherein movement of the conductive sleeve relative to the magnetic field is retarded by Eddy currents generated in the conductive sleeve by the movement, and wherein the magnet is fixed relative to the housing and includes an adjuster configured to adjust the position of the magnet relative to the conductive sleeve.

2. The air pressure regulator of claim 1 wherein vibrational movement of at least one of the regulator body, the valve stem, the air inlet, the air outlet, or the restraining element is retarded by Eddy currents generated in the conductive sleeve by the movement of the conductive sleeve relative to the magnetic field.

3. The air pressure regulator of claim 2 wherein at least one of the magnet or conductive sleeve is configured to retard vibrational movement in an aircraft.

4. The air pressure regulator of claim 1 wherein the restraining element includes a mechanical restraining element.

5. The air pressure regulator of claim 4 wherein the mechanical restraining element is a spring.

6. The air pressure regulator of claim 4 wherein the mechanical restraining element is a diaphragm.

7. The air pressure regulator of claim 1 wherein the restraining element is configured to restrain the valve stem such that the pressurized air from the air inlet is regulated for the air outlet.

8. The air pressure regulator of claim 1 wherein the magnet is at least one of a permanent magnet or an electromagnet.

9. The air pressure regulator of claim 8 wherein the magnet is axially magnetized.

10. The air pressure regulator of claim 8 wherein the electromagnet is configured to adjust the magnetic field based at least in part on the movement of the conductive sleeve.

11. The air pressure regulator of claim 1 wherein the valve stem includes a poppet valve configured to regulate the pressure of the pressurized air for the air outlet by way of movement of the poppet valve relative to the air inlet.

12. The air pressure regulator of claim 1 further including a cooling path configured to dissipate heat generated on the conductive sleeve.

13. The air pressure regulator of claim 1 wherein the regulator body includes a first housing defining a first interior having the air inlet, the air outlet, and at least a portion of the valve stem, and a second housing defining a second interior having the restraining element, the conductive sleeve, and the magnet.

14. An air pressure loading element comprises:

a housing defining a hollow interior;

a restraining element disposed within the hollow interior, having an electrically conductive sleeve encircling a hollow bore, and coupled with a valve stem positioned at an air inlet and configured to regulate the pressure of pressurized air for an air outlet by way of slidable movement of the valve stem relative to the air inlet, wherein the valve stem and the restraining element move in unison; and a magnet having a magnetic field mounted to the housing wherein the magnet is received by the hollow bore and the magnetic field encompasses at least part of the conductive sleeve;

wherein movement of the conductive sleeve relative to the magnetic field is retarded by Eddy currents generated in the conductive sleeve by the movement, and wherein the magnet is fixed relative to the housing and includes an adjuster configured to adjust the position of the magnet relative to the conductive sleeve.

15. The air pressure loading element of claim 14 wherein vibrational movement of at least one of the housing, the valve stem, the air inlet, the air outlet, or the restraining element is retarded by Eddy currents generated in the conductive sleeve by the movement of the conductive sleeve relative to the magnetic field.

16. The air pressure loading element of claim 15 wherein at least one of the magnet or conductive sleeve is configured to retard vibrational movement in an aircraft.

17. An air pressure regulator comprising:

a restricting element configured to provide variable restriction to regulate the pressure of pressurized air at an air inlet for an air outlet, by way of slidable movement of the restricting element relative to the air inlet;

a restraining element coupled with the restricting element and having an electrically conductive sleeve encircling a hollow bore, wherein the restricting element and the restraining element move in unison; and a magnet adjustably fixed proximate to the conductive sleeve by an adjuster and having a magnetic field, wherein the magnet is received by the hollow bore, the magnetic field encompasses at least part of the conductive sleeve, and the conductive sleeve is movable relative to the magnet;

wherein movement of the conductive sleeve relative to the magnetic field is retarded by Eddy currents generated in the conductive sleeve by the movement, and wherein the adjuster is configured to adjust the position of the magnet relative to the conductive sleeve.

18. The air pressure regulator of claim 17 wherein vibrational movement of at least one of the restricting element, the air inlet, the air outlet, or the restraining element is retarded by Eddy currents generated in the conductive sleeve by the movement of the conductive sleeve relative to the magnetic field.

19. The air pressure regulator of claim 18 wherein at least one of the magnet or conductive sleeve is configured to retard vibrational movement in an aircraft.

* * * * *